(No Model.)  6 Sheets—Sheet 1.

P. KENNY.
STOCK QUOTATION TELEGRAPH.

No. 339,558. Patented Apr. 6, 1886.

ATTEST:
E. C. Rowland
A. W. Kiddle.

INVENTOR
Patrick Kenny
By Dyer & Seely
Attys.

(No Model.)  6 Sheets—Sheet 2.

P. KENNY.
STOCK QUOTATION TELEGRAPH.

No. 339,558.  Patented Apr. 6, 1886.

ATTEST:
E. C. Rowland
H. W. Tiddle

INVENTOR:
Patrick Kenny
By Dyer & Seely
Attys.

N. PETERS, Photo-Lithographer, Washington, D. C.

(No Model.)

6 Sheets—Sheet 3.

P. KENNY.
STOCK QUOTATION TELEGRAPH.

No. 339,558. Patented Apr. 6, 1886.

ATTEST
E. C. Rowland
H. W. Kiddle

INVENTOR:
Patrick Kenny.
By Dyer & Seely
Attys.

(No Model.) 6 Sheets—Sheet 4.
P. KENNY.
STOCK QUOTATION TELEGRAPH.
No. 339,558. Patented Apr. 6, 1886.
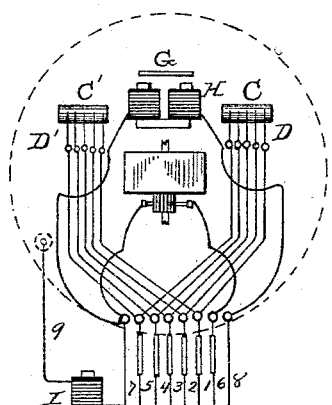

(No Model.)
6 Sheets—Sheet 5.

P. KENNY.
STOCK QUOTATION TELEGRAPH.

No. 339,558. Patented Apr. 6, 1886.

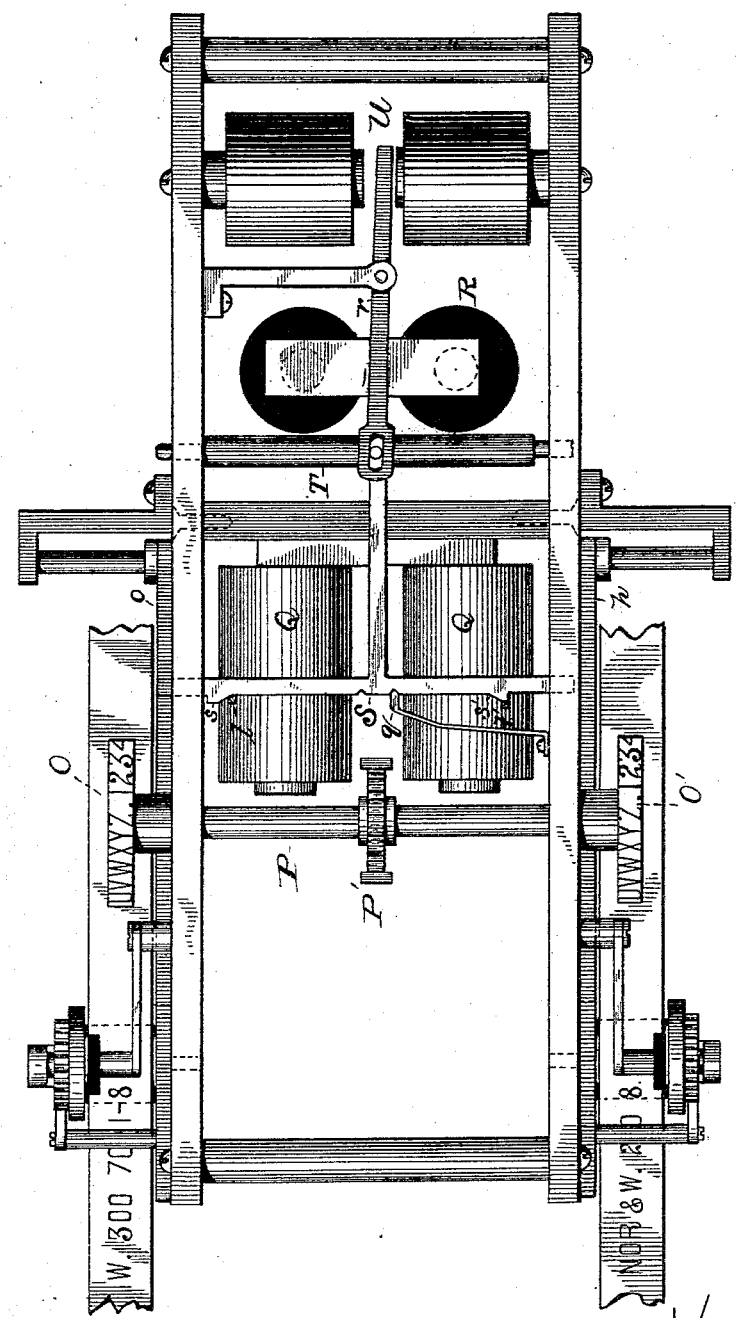

UNITED STATES PATENT OFFICE.

PATRICK KENNY, OF NEW YORK, N. Y.

STOCK-QUOTATION TELEGRAPH.

SPECIFICATION forming part of Letters Patent No. 339,558, dated April 6, 1886.

Application filed October 15, 1885. Serial No. 179,915. (No model.)

*To all whom it may concern:*

Be it known that I, PATRICK KENNY, of New York city, in the county and State of New York, have invented a certain new and useful Improvement in Stock-Quotation Telegraphs, of which the following is a specification.

The principal object I have in view is to produce a receiving-instrument and operating-circuit therefor whereby the record made by it will be divided between two tapes, so that the quotations of two different markets may be separated, or the active stocks separated from the inactive stocks of the same market, the record being thus made more easy of reference. This feature of the invention is applicable to the chemical stock-quotation telegraph covered by Patent No. 314,115, and also to printing-telegraphs or those employing type-wheels.

The invention further relates to certain details of construction of chemical receivers, the same forming an improvement upon the receiver described in said Patent No. 314,115.

Figure 1:
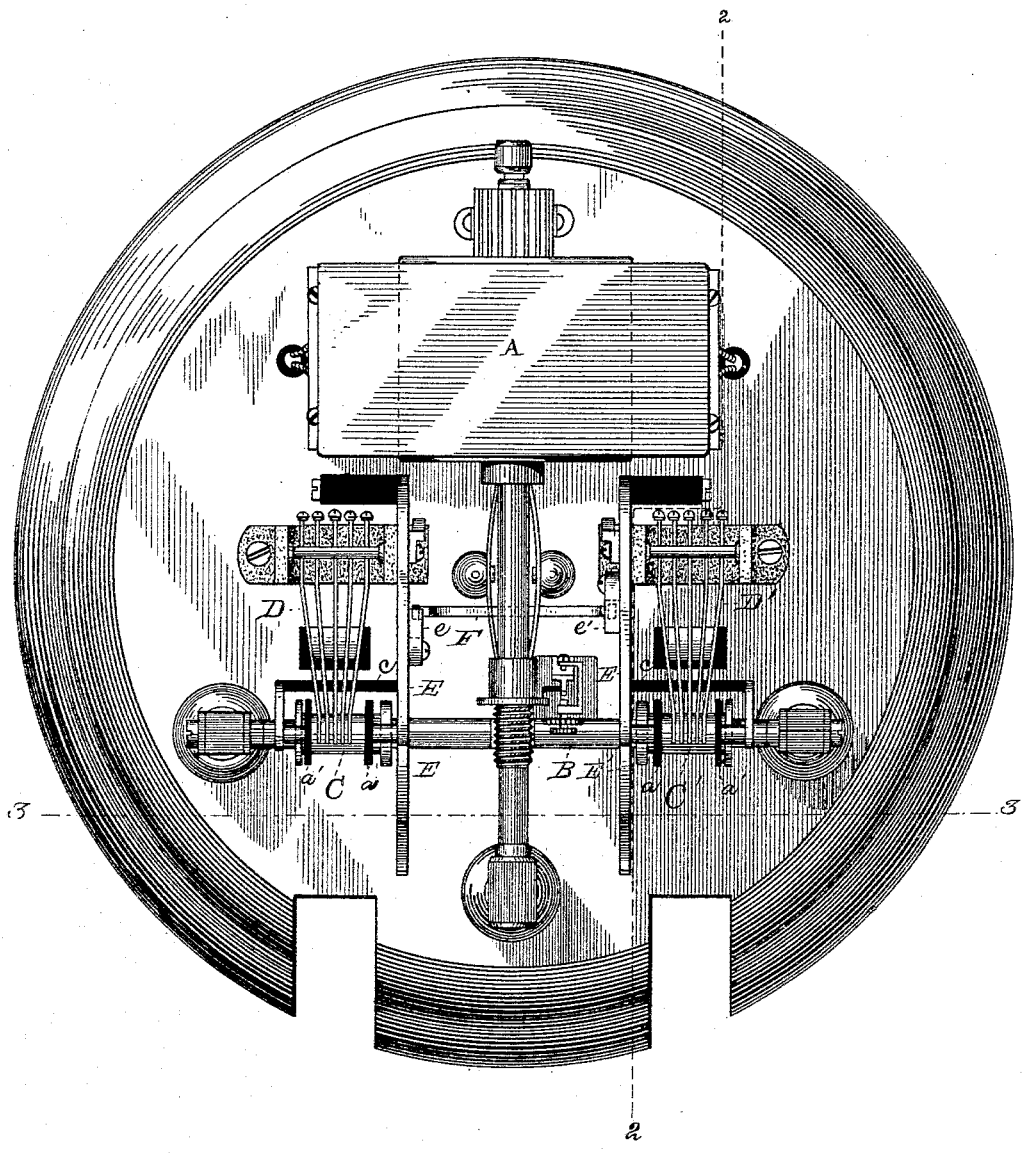
Figure 2:
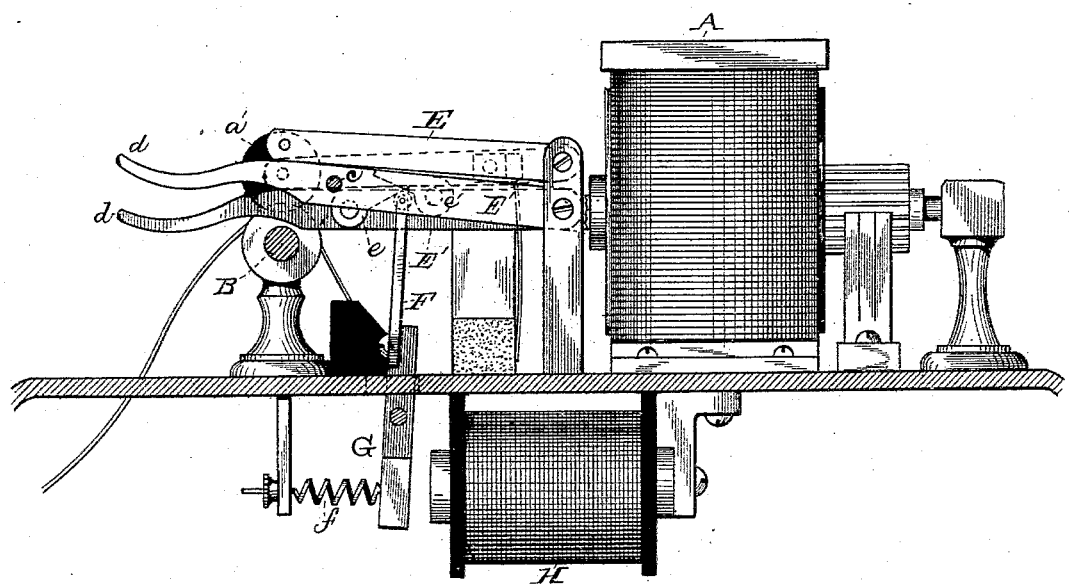
Figure 3:
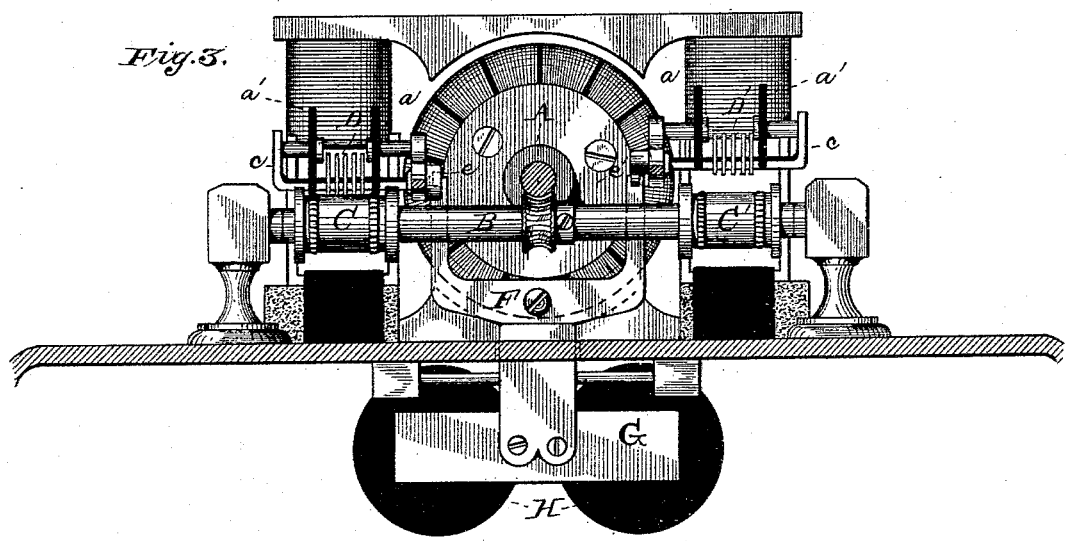
Figure 4:
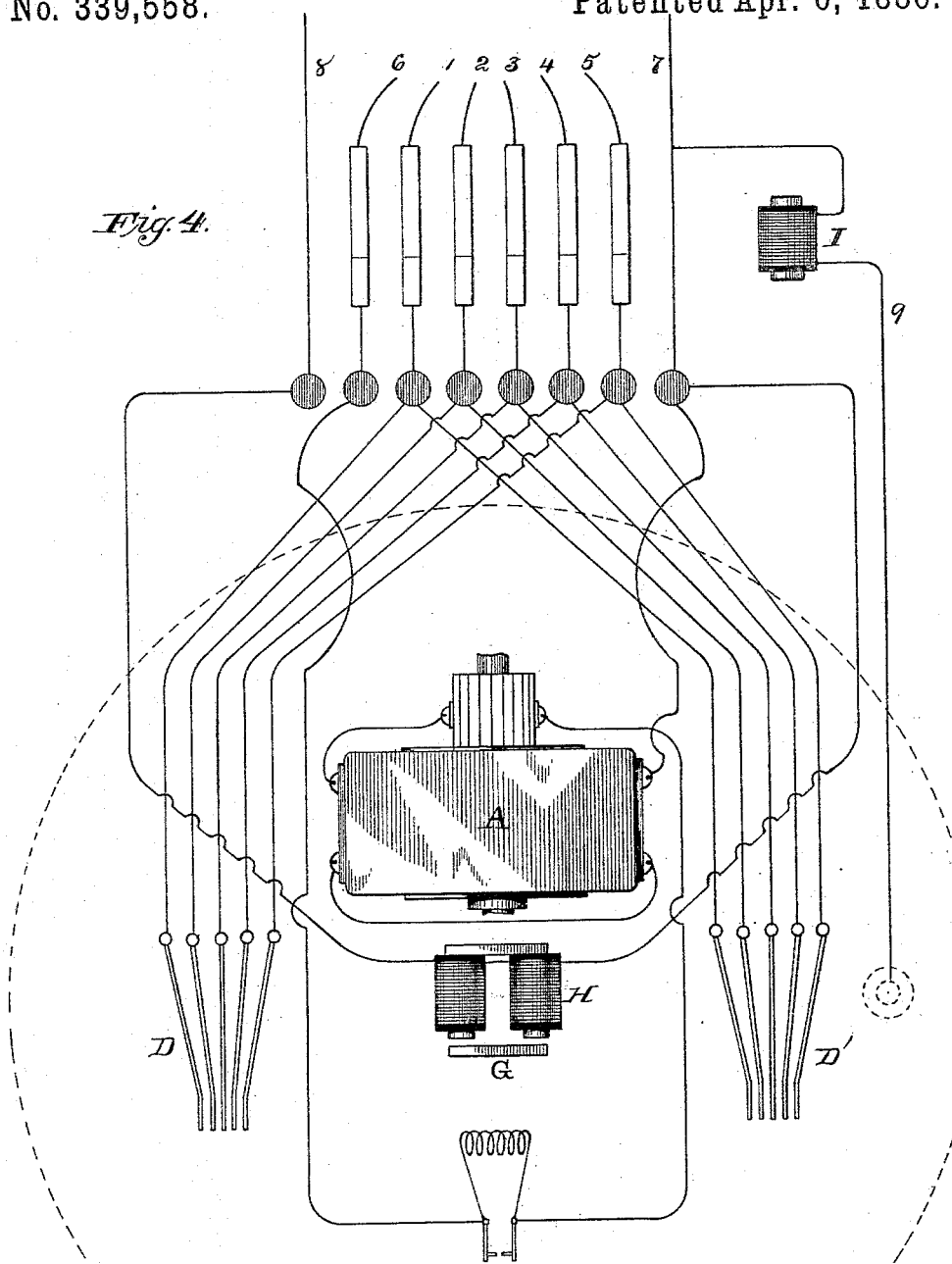
Figure 8:
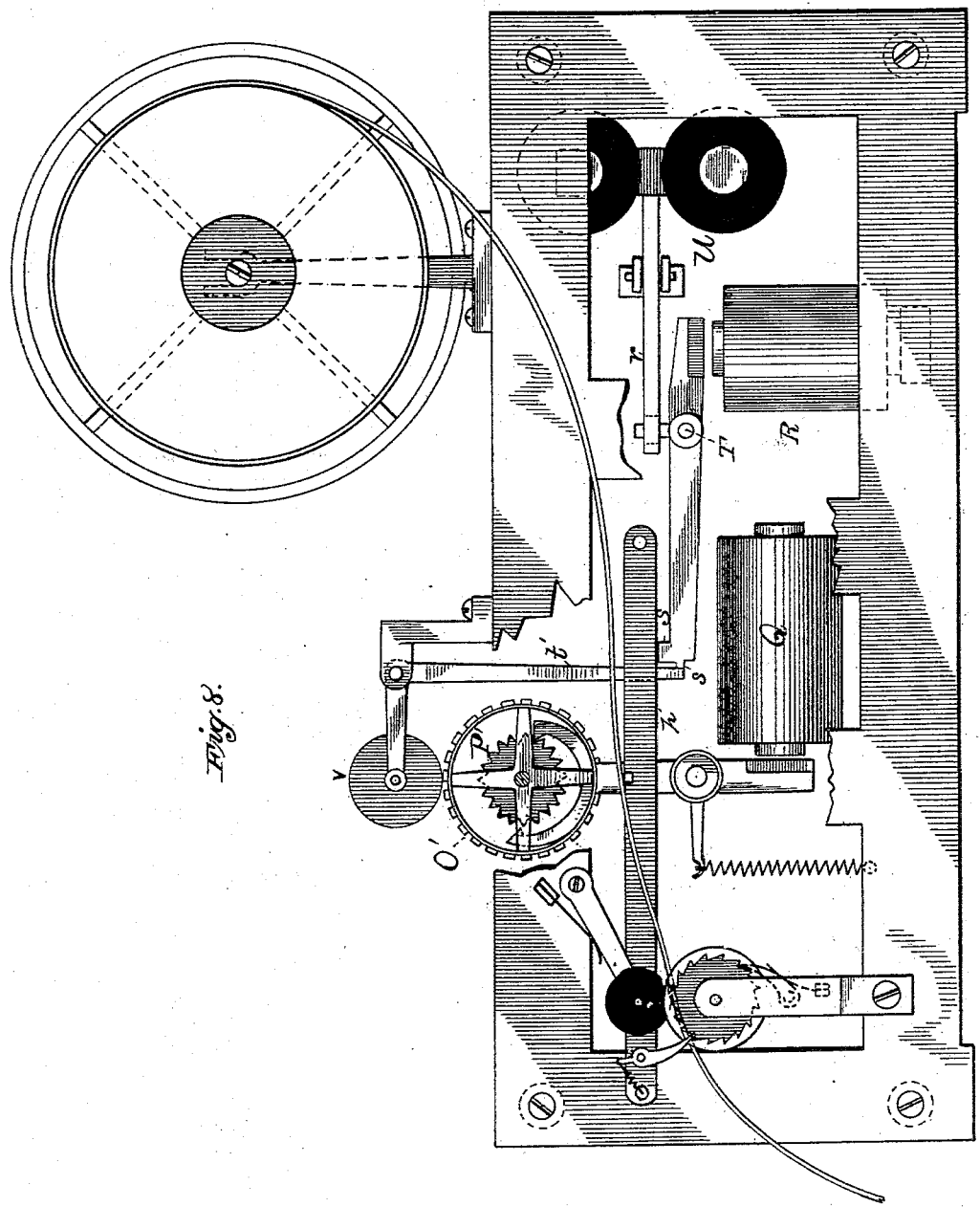

In the accompanying drawings, forming a part thereof, Figure 1 is a top view of a chemical receiver embodying the invention; Fig. 2, a vertical section of same on line 2 2; Fig. 3, a vertical section on line 3 3; Fig. 4, a diagram of the circuit within the chemical receiver; Fig. 5, a diagram of circuit, showing connection of receiver with transmitter; Fig. 6, a side elevation, with box in section, of cut-out for instrument; Fig. 7, a top view of the cut-out springs; Fig. 8, a side elevation, with frame partly broken away, of a printing-telegraph receiving-instrument embodying the principal feature of invention; and Fig. 9, a top view of same.

The chemical receiver shown in Figs. 1 to 7, inclusive, is an improvement upon the receiver covered by Patent No. 314,115. With reference more particularly to these figures, A is the electro-dynamic motor operating by a worm the shaft B, at right angles to the motor-shaft. Shaft B carries two receiving-rollers, C C′, located at opposite ends of the shaft, and upon these rollers rest when in operation the two sets of receiving-pens D D′. Two pressing-wheels, $a$ $a'$, are used in connection with each receiving-roller. The wheel $a$ of each roller is at the inner end of the roller, and is carried by a stud from an arm, E, which is pivoted to a standard, $b$, this arm extending across shaft B at right angles thereto. Directly beneath arm E is a similar arm, E′, having a cross-arm, $c$, extending outwardly beneath the pens of the set, and carrying by a stud from its outer end the other pressing-wheel, $a'$. Arm E′ has a finger-piece, $d$, to raise it by. When the pressing-wheels are down, there is a small distance between arms E and E′, so that the pressing-wheels are independent in their action on the tape; but when arm E is raised it carries with it arm E′ at the same time that it lifts the pens from the receiving-roller. To the inner sides of the lower arm, E′, are rigidly secured cam-pieces $e$ $e'$, with which engage the ends of a forked arm, F, carried by a vertical armature, G, pivoted in the base of the instrument centrally between the arms and extending beneath such base. This armature is attracted by an electro-magnet, H, and drawn away from such magnet by a spring, $f$. The cam-pieces $e$ $e'$ are oppositely turned, as shown, and the forked arm F engages with one cam when the armature G is in one position, and with the other cam when armature G is in the other position. The effect is to raise one or the other set of pens, as well as the corresponding pressing-wheels, so that the circuit through the pens of the set raised will be broken and the tape will cease to be fed by the roller. As arranged, when magnet H is demagnetized and spring $f$ draws armature G backward, the set of pens D′ is raised and the pressing-wheels $a$ $a'$ are lifted from roller C′. When magnet H is magnetized and attracts armature G, pens D are raised and pens D′ dropped, the corresponding pressing-wheels being also raised and dropped.

To work the receiver having the shifting-magnet, I provide the line running to the receiver with five pen-wires 1 2 3 4 5, a motor-wire, 6, and a common return-wire, 7, as in Patent No. 314,115. In addition, I provide a shifting-wire, 8, which includes between it and the common return 7 the coils of electro-magnet H. At the receiver the pen-wires are divided each into two branches, which run to corresponding pens of the opposite sets, as shown in Figs. 4 and 5. The pen-current passes from the pens in operation through the tape to the roller and to base. From base a wire, 9, extends to the common return, in which wire are included the coils of an electro-magnet, I. The armature K of this magnet holds up a spring-lever, L, Fig. 6, provided with a bar, $g$, of insulation. When lever L is released and is thrown down by its spring $h$, bar $g$ bears on the free ends of six contact-springs, M, and separates them from stationary contacts M'. Springs M and contacts M' are arranged in all the line-wires except the common return 7 and the shifting magnet-wire 8. Additional springs may, however, be provided for these wires. The function of magnet I is to break the circuit of the instrument when an abnormal current flows over the pen-wires, which would be the case should the tape break or become exhausted, so as to permit the pens to come directly into contact with a receiving-roller. For this reason this magnet is given the peculiar location described, where it is affected only by the pen-wire current, which it conducts from base back to the common return-wire. There is no other base-connection except that described.

In Fig. 5 the transmitter and battery are shown in diagram, N being the transmitting-roller, $i$ the pen and motor battery, and $k$ the shifting-battery. Switches $l$ $m$ $n$ control the pen-motor and shifting-circuits. The opening or closing of the switch $n$ will throw one or the other set of receiving-pens into circuit, as before explained. The application of this feature to printing-telegraphs or type-wheel printers is shown in Figs. 8 and 9, to which reference is now particularly made.

O O' are two type-wheels, mounted on a common shaft, P, and controlled by a single escapement, P', operated by the type-wheel magnet Q.

R is the printing-magnet, working the two printing-levers $o$ $p$ separately by a cross-bar, S, carried by an arm projecting from a rock-shaft, T, which is rocked by the printing-magnet R. Shaft T slides in its bearings sufficiently to bring bar S under one printing-lever while it clears the other. The bar is held at the limit of its movement by spring $q$.

U is the shifting-magnet, connected by lever $r$ with shaft T, and throwing this shaft one way or the other, according to which printing-lever it is desired to raise.

Cams $s$ $s'$ are carried by bar S, which engage alternately with arms $t$ $t'$ of ink-rollers V and raise the ink-rollers alternately from the type-wheels to take friction off of type-wheel not in use and prevent accumulation of ink thereon.

Magnet U has a polarized armature; but it may be a non-polarized magnet, as is shifting-magnet H; or any other well-known electro-magnetic device for producing movement may be applied for shifting the two sets of recording devices into and out of operation in either the chemical or printing receiver.

By reversing the current in circuit of magnet U the shifting of the printing devices will be effected.

Since in the printing-receivers the tapes are fed by the movement of the printing-levers, as will be well understood, the tape which is not being printed upon will not be fed forward, but will remain at rest until its printing-lever is moved.

What I claim is—

1. In stock-quotation-telegraph receivers, the combination of two sets of recording devices with separate tapes therefor, and a shifting mechanism throwing them alternately into operation, substantially as set forth.

2. In stock-quotation-telegraph receivers, the combination of two sets of recording devices with separate tapes therefor, and means controlled from the transmitting-office for throwing them alternately into operation, substantially as set forth.

3. In stock-quotation-telegraph receivers, the combination, with the line, of two sets of recording devices with separate tapes therefor connected with and operated from said line, and an electro-magnetic shifting device in an independent circuit for throwing the recording devices alternately into operation, substantially as set forth.

4. In stock-quotation-telegraph receivers, the combination of two sets of recording devices, two sets of tape-feeding devices, and a shifting mechanism throwing the recording devices and corresponding feeding devices alternately into operation, substantially as set forth.

5. In chemical stock-quotation receivers, the combination of the two sets of pens, the two receiving-rollers, and the electro-magnetic shifting mechanism lifting the sets of pens alternately from the receiving-rollers, substantially as set forth.

6. In chemical stock-quotation receivers, the combination of two sets of pens, the two receiving-rollers, the two sets of pressing-wheels, and the electro-magnetic shifting mechanism lifting the sets of pens and corresponding pressing-wheels alternately from the receiving-rollers, substantially as set forth.

7. In chemical stock-quotation receivers, the combination, with a receiving-roller and the recording-pens, of independently-bearing pressing-wheels taking on opposite ends of said roller, so as to hold the edges of the tape independently, substantially as set forth.

8. In chemical stock-quotation receivers, the combination, with the pen and motor wires, of an electro-magnetic circuit-opener located in the circuit of the pen-wires, substantially as set forth.

9. In chemical stock-quotation receivers, the combination, with the pen and motor wires, the former going to base through the pens, of an electro-magnetic circuit-opener located in a connection from the base to the common return for both pen and motor wires, substantially as set forth.

This specification signed and witnessed this 8th day of October, 1885.

PATRICK KENNY.

Witnesses:
A. W. KIDDLE,
E. C. ROWLAND.